United States Patent [19]

Abraham et al.

[11] Patent Number: 5,432,925
[45] Date of Patent: Jul. 11, 1995

[54] SYSTEM FOR PROVIDING A UNIFORM EXTERNAL INTERFACE FOR AN OBJECT ORIENTED COMPUTING SYSTEM

[75] Inventors: Robert L. Abraham, Marietta, Ga.; Charles B. Harvey, Jr., Austin, Tex.; Teresa E. Merrick, Closter, N.J.; Herman Mitchell, Lithonia, Ga.; Adrienne Tin, Ridgefield Park, N.J.; James R. Wason, Tuxedo, N.Y.

[73] Assignee: International Business Machines Corporation, Armonk, N.Y.

[21] Appl. No.: 101,904

[22] Filed: Aug. 4, 1993

[51] Int. Cl.⁶ .............................................. G06F 3/00
[52] U.S. Cl. .................................................. 395/500
[58] Field of Search ............................... 395/500, 600

[56] References Cited

U.S. PATENT DOCUMENTS

| | | |
|---|---|---|
| 4,930,071 | 5/1990 | Tou et al. |
| 4,989,132 | 1/1991 | Mellender et al. |
| 5,129,083 | 7/1992 | Cutler et al. |
| 5,212,787 | 5/1993 | Baker et al. ........................ 395/600 |
| 5,261,080 | 11/1993 | Khoyi et al. ........................ 395/500 |
| 5,297,279 | 3/1994 | Bannon et al. ..................... 395/600 |
| 5,315,709 | 5/1994 | Alston, Jr. et al. ................. 395/600 |
| 5,317,742 | 5/1994 | Bapat .................................. 395/700 |
| 5,327,559 | 7/1994 | Priven et al. ....................... 395/700 |
| 5,379,432 | 1/1995 | Orton et al. ........................ 395/700 |

OTHER PUBLICATIONS

*Object-Oriented Programming in C—The Linnaeus System*, IBM Technical Disclosure Bulletin, vol. 32, No. 9B, Feb. 1990, pp. 437-439.
*Changing Configuration Files Under Program Control*, T. H. Schaefer et al., IBM Technical Disclosure Bulletin, vol. 33, No. 6A, Nov. 1990, p. 242.
*Implementation of a National Lanuage Support Enabled Unit of Measure Object Class*, F. W. Shackelford et al., IBM Technical Disclosure Bulletin, vol. 33, No. 9, Feb. 1991, pp. 450-463.

Primary Examiner—Parshotam S. Lall
Assistant Examiner—Richard L. Ellis
Attorney, Agent, or Firm—Bell, Seltzer, Park & Gibson

[57] ABSTRACT

Objects import data from, and export data to, a plurality of external systems in an object oriented computing system via a uniform external interface. The uniform interface includes external interface layers and internal interface layers. Each external interface layer converts data from the associated external system into an identifying token and data value. The external layer also converts an identifying token and data value into data which is formatted for the associated external system. The internal interface layer accepts an identifying token and data value from the external interface layer and converts the data value to a data attribute associated with an object. The internal interface layer also converts a data attribute into an identifying token and data value and provides the token and data value to the external interface layer. Thus, objects need only communicate with the internal interface layer in order to import and export data. The external interface layer includes customized conversion routines for converting a token and data value to data which is useable by an external system. Data validation and storage takes place via the internal interface layer. Accordingly, replication of code is minimized and the complexity of the object oriented system is reduced.

2 Claims, 8 Drawing Sheets

RULERS: VER2
WORK-OBJ: PO1 HDR

```
PO PARTS PANEL
   PO1
   VER2
   JIM'S PO
1. HEADER
2. LINES ──────→ RULERS: VER2, PO HDR
3. TEXT
```

```
PO LINE LIST
   PO1
   VER2
   JIM'S PO

- LINE1
- LINE2
```

RULERS: VER2
WORK-OBJ: PO1 HDR

```
PO PARTS PANEL
   PO1
   VER2
1. HEADER ──────→ RULERS: VER2
2. LINES            WORK-OBJ: PO1 HDR
3. TEXT
```

```
PO HDR PANEL
   VER2
PO ID: PO1
PO NAME: JIM'
```

RULERS: VER2
WORK-OBJ: PO1 HDR

```
PO PARTS PANEL
   PO1
   VER2
1. HEADER
2. LINES
3. TEXT ──────→ RULERS: VER2
                        PO1 HDR
                WORK-OBJ: PO1 TEXT
```

```
PO TEXT PANEL
   PO1
   VER2
   JIM'S PO

TEXT: THIS IS
```

FIG. 15.

SYSTEM FOR PROVIDING A UNIFORM EXTERNAL INTERFACE FOR AN OBJECT ORIENTED COMPUTING SYSTEM

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented programming systems are composed of a large number of "objects". An object is a data structure, also referred to as a "frame", and a set of operations or functions, also referred to as "methods", that can access that data structure. The frame has many "slots", each of which contains an "attribute" of the data in the slot. The attribute may be a primitive (such as an integer or string) or an object reference which is a pointer to another object. Objects having identical data structures and common behavior can be grouped together into, and collectively identified as, a "class".

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances are established during "build time" or generation of the object oriented computing environment, i.e. prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e. the ancestor). The data structure of the child class includes all of the attributes of the parent class.

A primary advantage of object oriented computing systems is the "encapsulation" of data. The data, represented by the object frame, is encapsulated or surrounded by its methods. Only the object's methods can access the data structure within the object. Accordingly, all data handling is performed by the object which "owns" the data.

The data encapsulated in an object is typically updated or retrieved by many external systems or activities. For example, the data may be updated or retrieved by a user operating interactively. Alternatively, the data may be updated or retrieved as a part of a batch process. As another alternative, another application or system may require synchronous or asynchronous access or update of the data.

Heretofore, a unique external interface was provided between the object and each external system with which the object interacted. Unfortunately, the proliferation of external interfaces complicated the structure of the object oriented system. Indeed, the need for separate interfaces has reduced the advantage of data encapsulation, since data validations and data conversion routines were replicated to handle each type of interface. Moreover, since validation and data manipulation logic may not be uniformly positioned in the various interfaces, no single object had total responsibility for the encapsulated data. This made it difficult to add additional interfaces.

The need for separate interfaces also complicated the object oriented computing system because each interface typically passed data at different levels of semantics. Each piece of data in an object oriented computing system has at least three different levels of semantics: the user level which defines how the data is presented to the user; the data level which defines how the data is stored in nonvolatile storage; and the internal representation in object space, i.e. the object oriented version of real memory. Thus, although a single object was often passing data to a variety of interfaces, each interface typically required a different level of semantics.

SUMMARY OF THE INVENTION

It is therefore an object of the present invention to provide a system and method for providing a uniform interface to external systems in an object oriented computing environment.

It is another object of the invention to provide a system and method which reduces the replication of data validation and data conversion routines in an object oriented computing environment.

These and other objects are accomplished, according to the present invention, by providing a uniform external interface for an object oriented computing system in which selected objects import data from, and export data to, a plurality of external systems. The uniform interface includes a plurality of external interface layers each of which is associated with a corresponding one of a plurality of external systems, and an internal interface layer which is responsive to the selected objects and to the external interface layer.

Each external interface layer includes means for converting data from the associated external system into an identifying token and a data value. The external interface layer also includes means for converting an identifying token and a data value into data which is formatted for the associated external system. The internal interface layer includes means for accepting the identifying token and the data value from the external interface layer and for converting the data value to a data attribute associated with one of the selected objects. The internal interface layer also includes means responsive to the selected objects, for converting a data attribute into an identifying token and a corresponding data value and for providing the same to the external interface layer. The accepting means of the internal interface layer also preferably includes means for validating the data value and for storing the corresponding data value in nonvolatile storage.

Thus, according to the invention, the objects need only communicate with the internal interface layer in order to import and export data. The internal interface layer communicates with an external interface layer for each system to which the data is imported from or exported to. The external interface layer includes the customized conversion routines for converting a token and a data value to data which is useable by the external system. However, all data validation and storage takes place via the internal interface layer. Only a token and a value are passed between the internal interface layer and the external interface layer. Accordingly, replication of code is minimized and the complexity of the object oriented system is reduced.

In a preferred embodiment of the present invention, the internal interface layer comprises an externalizable object class. The accepting means of the internal interface layer comprises an "assign data" method of the externalizable object class and the converting means of the internal interface layer comprises a "get data" method of the externalizable object class. Each of the selected objects which is capable of importing and exporting data is arranged to be a child object of the externalizable object class in the hierarchy of objects.

In a method according to the present invention, selected objects which import and export data are arranged to be child objects of the externalizable object class to thereby inherit the assign data method and the get data method. In response to a request to import data into one of the selected objects, the data to be imported is converted into an identifying token and a data value by the externalizable class and the assign data method is then executed on the identifying token and the data value. In response to a request to export data from one of the selected objects, the get data method is executed on the object and the resulting token and value is converted into data to be exported.

BRIEF DESCRIPTION OF THE DRAWINGS

FIGS. 8, 9, 10, 11, 12, 13, 14, and 15 illustrate a detailed design implementation of a uniform external interface method and system according to the present invention.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing a system and method for providing a uniform interface according to the invention, a general overview of object oriented computing environments will be provided. An overview of a system and method for providing a uniform interface will then be provided, followed by a detailed design description.

Object Oriented Computing Environment

In an object oriented computing environment, work is accomplished by sending action request messages to an object which contains data. The object will perform a requested action on the data according to its predefined methods. Objects may be grouped into object classes which define the types and meanings of the data, and the action requests (messages) that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class. An object may be represented schematically, and is represented herein, by a rectangle including an upper rectangle and a lower rectangle within the object rectangle. The upper rectangle contains the data structure represented by a frame having slots, each of which contains an attribute of the data in the slot. The lower rectangle indicates the object's methods which encapsulate the frame and which are used to perform actions on the data encapsulated in the frame of the upper rectangle.

Figure 1:
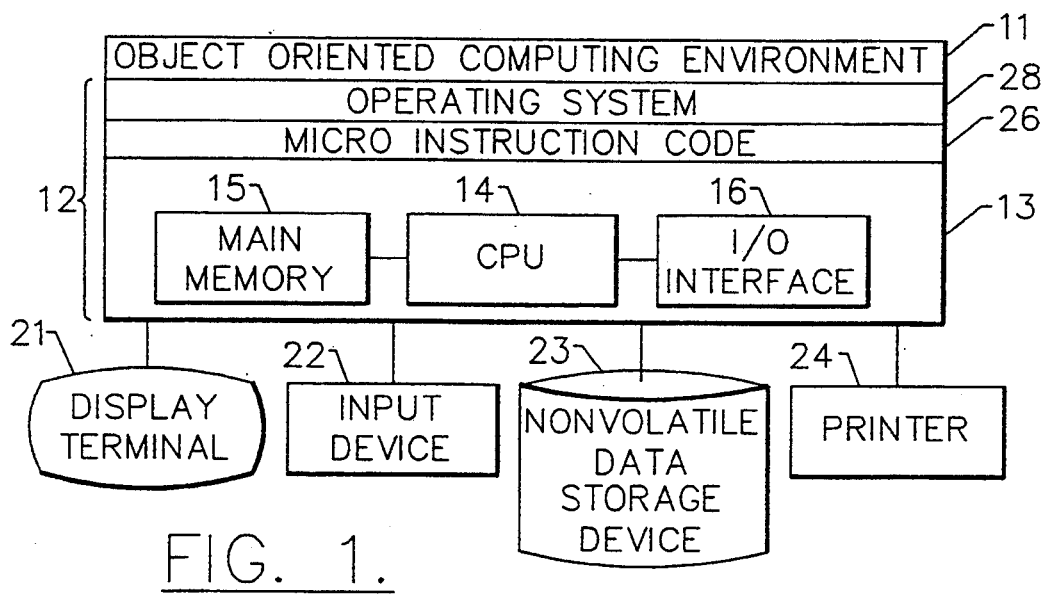
FIG. 1 schematically illustrates a hardware and software environment in which the present invention operates.

Referring now to FIG. 1, a hardware and software environment in which the present invention operates will now be described. As shown in FIG. 1, the present invention is a method and system for supporting Complex Objects within an object oriented computing environment 11 operating on one or more computer platforms 12. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 28.

As shown in FIG. 1, object oriented computing environment 11 operates on computer platform 12. For example, each computer platform 12 may be a computer having an IBM System 370 architecture. However, it will be understood by those having skill in the art that object oriented computing environment 11 may operate across multiple computer platforms. Operating system 28 may be an IBM multiple virtual storage (MVS). Object oriented computing environment 11 is preferably written in Intermediate C, which is an object oriented dialect of the C computer programming language and is similar to the C++ computer programming language. The design and operation of computer platforms and object oriented computing environments including that of an object manager, are well known to those having skill in the art and are described, for example in U.S. patent application Ser. No. 07/602,442, filed Oct. 23, 1990 to Abraham et al. entitled A Messenger and Object Manager to Implement an Object Oriented Environment; and U.S. Pat. Nos. 5,161,225 to Abraham et al. entitled Persistent Stream for Processing Time Consuming and Reusable Queries in an Object Oriented Database Management System; 5,151,987 to Abraham et al. entitled Recovery Objects in an Object Oriented Computing Environment; and 5,161,223 to Abraham entitled Resumeable Batch Query for Processing Time Consuming Queries in an Object Oriented Database Management System, all assigned to the assignee of the present invention, the disclosures of which are hereby incorporated herein by reference, and in numerous textbooks such as Object Oriented Software Construction by Bertrand Meyer, published by Prentice Hall in 1988, the disclosure of which is incorporated herein by reference.

Figure 2:
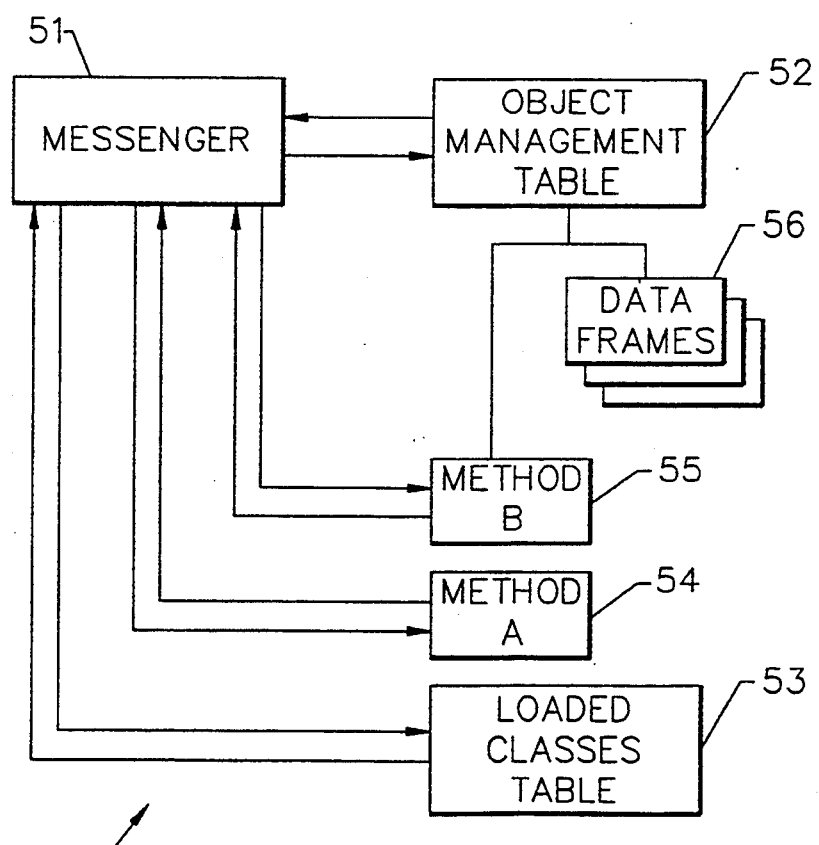
FIG. 2 schematically illustrates the main components of an object oriented computing system.
Figure 5:
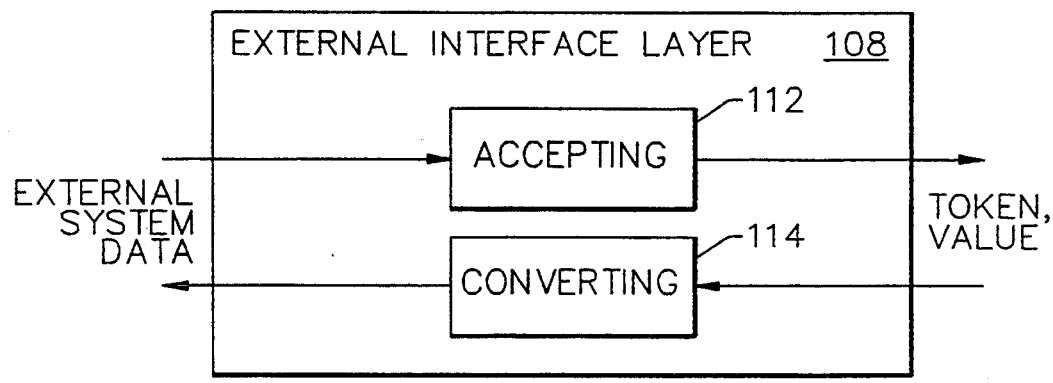
FIG. 5 illustrates details of the external interface layer of FIG. 4.

Referring now to FIG. 2, which is a reproduction of FIG. 5 of the aforesaid application Ser. No. 07/425,607, the main components of an object oriented program (11, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, object oriented program 11 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 11 will now be described for the example illustrated in FIG. 2, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Figure 3:
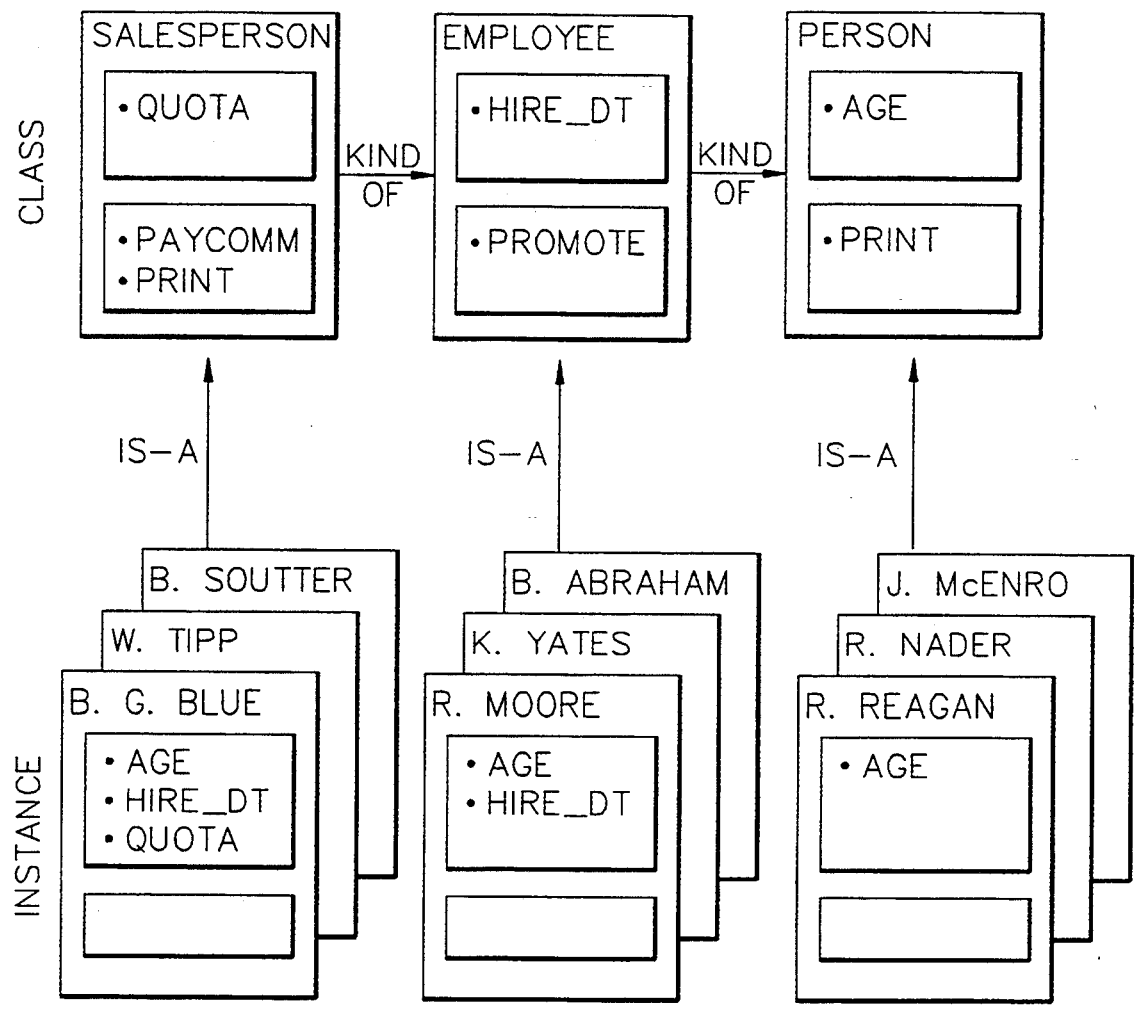
FIG. 3 illustrates an example of an inheritance hierarchy in an object oriented computing system.

FIG. 3 illustrates an example of an inheritance hierarchy in an object oriented computing platform. As shown, three object classes are illustrated for "salesperson", "employee", and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates, and R. Moore are employees. J. McEnroe, R. Nader, and R. Reagan are persons. In other words, an instance is related to its class by an "is a" relation.

Each subclass "inherits" the frames and methods of its superclass. Thus, for example, a salesperson frame inherits age and hire date objects from the employee's superclass as well as promote methods from the employee superclass. Salesperson also includes a unique quota attribute and a pay commission method. Each instance can access all methods and frames of its superclass, so that, for example, B. G. Blue can be promoted.

Uniform Interface Method and System: Overall Design and Operation

Figure 4:
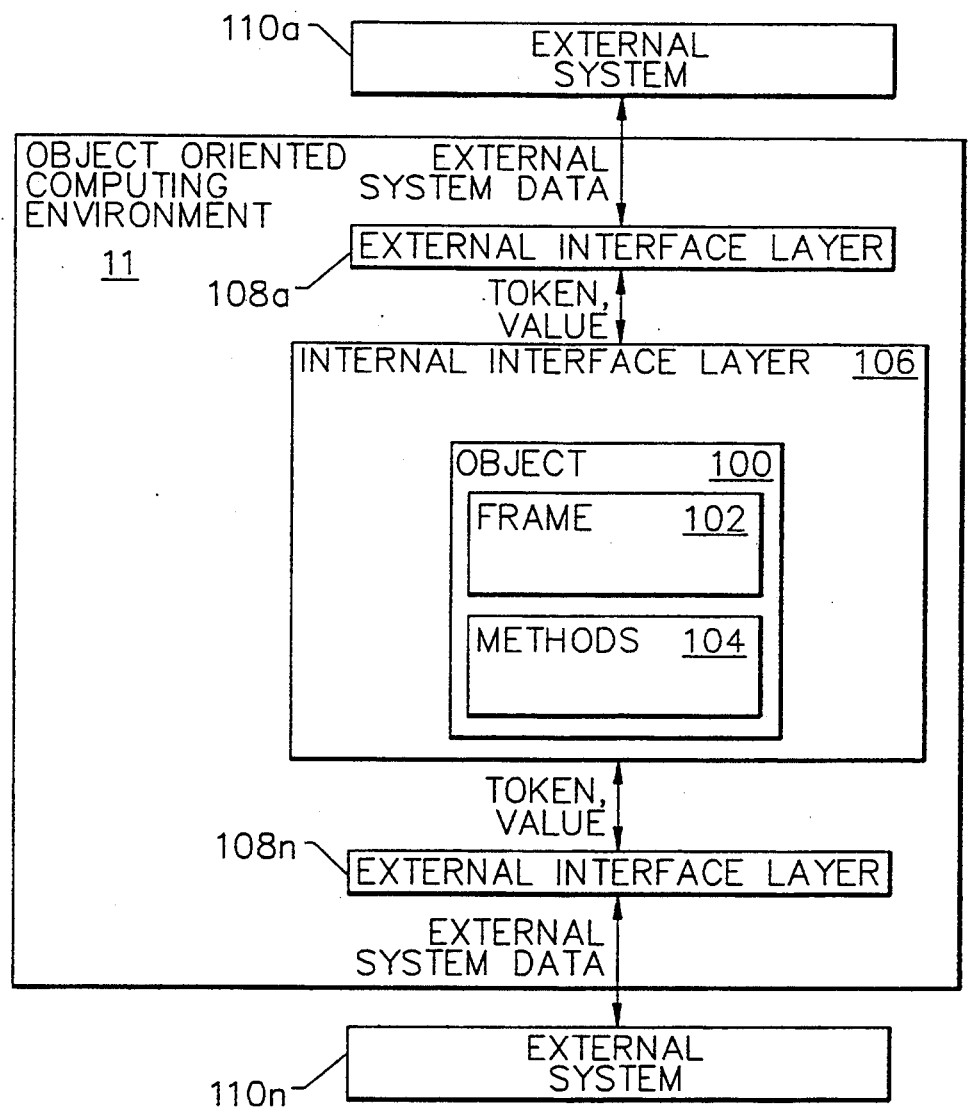
FIG. 4 illustrates an object oriented computing environment including a uniform external interface method and system according to the present invention.

Referring now to FIG. 4, an object oriented computing environment including a uniform external interface method and system according to the present invention, is illustrated. As shown in FIG. 4, object oriented computing environment 11 includes a plurality of objects 100, only one of which is shown in FIG. 4. Each object 100 includes a corresponding object frame 102 containing data attributes and at least one object method 104 for performing actions on the associated data attributes.

A uniform external interface according to the present invention includes an internal interface layer 106 and a plurality of external interface layers 108a . . . 108n for interfacing with a plurality of external systems 110a . . . 110n. It will be understood by those having skill in the art that each external system 110 may be another object oriented computing system, an input/output system such as a workstation for displaying a plurality of panels, or any other external system.

Still referring to FIG. 4, each external interface layer converts external system data into a token and value so that internal interface layer is responsive to a token and value regardless of the source of the data. As used herein, a token is a data element name or field identifier. Accordingly, the internal interface layer validates the data value by operating upon the token and value and also stores the token and value in nonvolatile storage. The external interface layer 108 is only responsible for converting the token and value into external system data which can be used by an associated external system. Generic interface functions are provided by internal interface layer 106, while system specific interface functions are provided by the external interface layer 108. Duplication of function is thereby reduced.

FIG. 5 illustrates details of the external interface layer. As shown, external interface layer 108 includes first accepting means 112 for accepting data from the associated external system and for converting the accepted data into an identifying token and a data value. External interface layer 108 also includes first converting means 114 for converting an identified token and a data value into data which is formatted for the associated external system.

Figure 6:
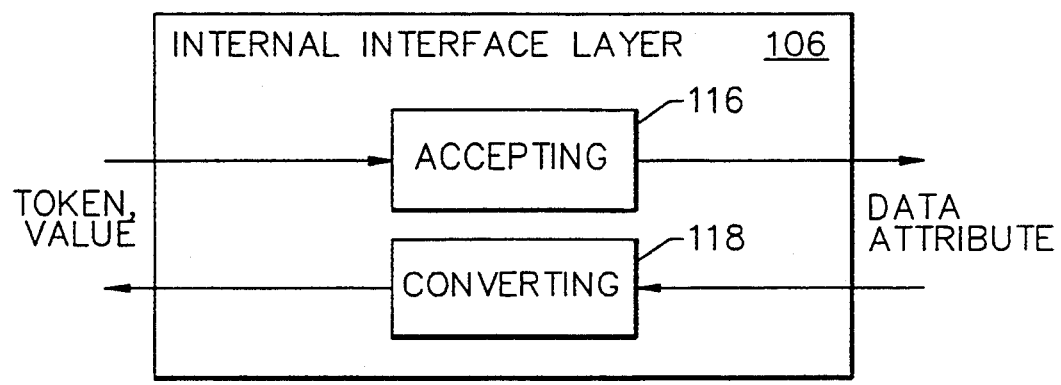
FIG. 6 illustrates details of the internal interface layer of FIG. 4.

FIG. 6 illustrates details of the internal interface layer 106. As shown, internal interface layer 106 includes second accepting means 116 for accepting the identifying token and data value from the external interface layer and for converting the data value to a data attribute which is associated with one of the selected objects. A second converting means 118 is also included which converts data attributes into an identifying token and a corresponding data value and provides the same to the external interface layer.

As will be described below, the internal interface layer 106 may be implemented using an externalizable object class which includes an "assign data" method and a "get data" method. The second accepting means 116 may be implemented via the assign data method and the second converting means 118 may be implemented via the get data method.

Figure 7:
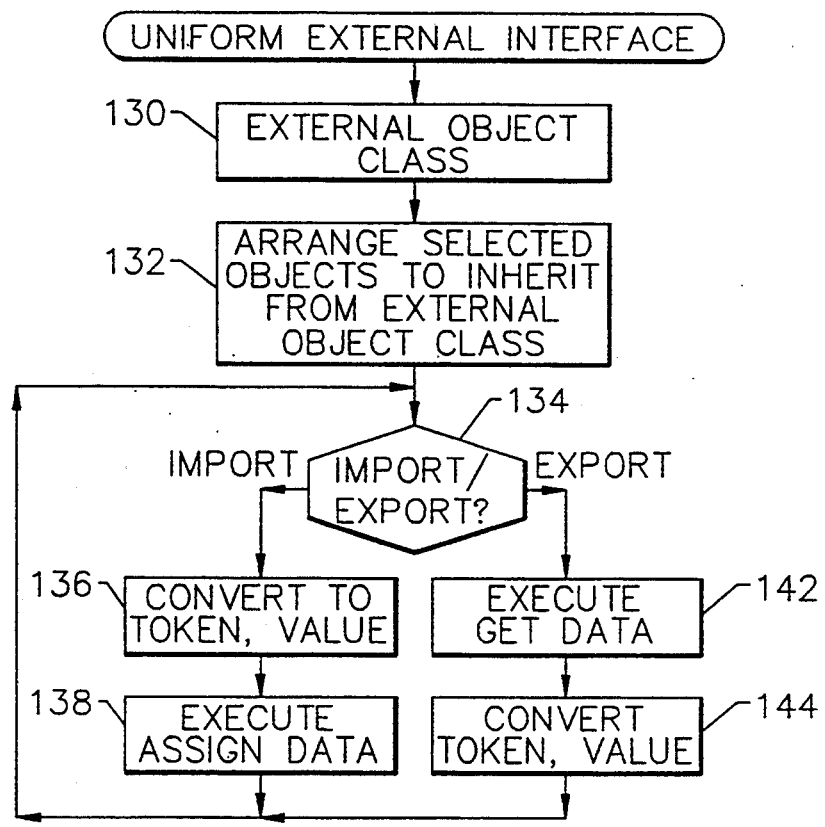
FIG. 7 illustrates operations for implementing a uniform external interface using an externalizable object class according to the present invention.

Referring now to FIG. 7, operations for implementing a uniform external internal interface using an externalizable object class are described. As shown at Block 130, an externalizable object class is provided. The externalizable object class includes an assign data method for converting an identifying token and a corresponding value into a data attribute associated with one of the selected objects. A get data method is also included for converting a data attribute into an identifying token and a corresponding data value. As shown in Block 132, the selected objects are arranged to inherit from the externalizable object class in the inheritance hierarchy objects, to thereby inherit the assign data method and the get data method. It will be understood by those having skill in the art that the operations at Blocks 130 and 132 are typically performed at "build time" of the object oriented computing environment.

Still referring to FIG. 7, in response to a request to import data (Block 134) the data to be imported is converted into an identifying token and a data value at Block 136. The assign data method is then executed. In response to an export data request at Block 134, the get data method is executed at Block 142 and the token and value are converted into data to be exported at Block 145.

The invention provides a precise definition of the boundary between external and internal processing. Some of the external processing is still within the realm of the object oriented computing environment. For example, overall process flows such as panel flows and major business processes are still within the realm of the object oriented computing environment. However, a uniform internal layer of processing is defined. All data is presented to the internal layer in string format, and at a level of semantics equivalent to that used for interactive presentation. All additional data manipulation and conversion is performed by the internal interface layer regardless of the source of the interface. The same is true for presentation of the data to the external interface layer. A generic Externalizable Object is provided which fully defines the interface for the external layer. The Externalizable Object provides support for data conversion, validations, processing flow, and unit of work control.

The present invention greatly simplifies display panel processing. As is understood by those having skill in the art, typically each persistent object will have a data entry panel for display of its data. Similarly, streams of persistent objects have associated list panels. As used herein, a persistent object is an object which is stored in nonvolatile data storage. Most externalized objects are persistent. There are other objects such as linked lists, which are not persistent. These objects are only in volatile storage and are lost when the object oriented computing session ends. A stream is a linked list of all instances that match a search criteria.

According to the invention, simplification of panel processing is provided by providing generic processing for data entry and list panels to interact with the Externalizable Object. This includes processing control flow. The individual panels are then captured by the dialog tag definition, and the name of the internal object or stream with which they interact. Accordingly, defining a panel is reduced to creating its dialog tag file, and redefining the dialog tag file name and the name of the internal object or stream. Panel processing is thereby greatly simplified.

Similarly, the invention provides for simplification of background processing because control flow for background updates is handled at a generic level at the Externalizable Object. The same data manipulation and validation methods required for online interfaces are used for the background interface. Accordingly, duplication of code to interface with background processing is not required.

Uniform External Interface Method and System: Detailed Design and Implementation Referring now to FIGS. 8–15, a detailed design implementation of a uniform external interface method and system according to the present invention will now be described. An object in object oriented programming is a combination of data and behavior. This implies that there is a layer of function wrapped around the data which mediates any access to that data by the rest of the world. If "data" means the contents of a database, then the objects which are wrapped around the access and update of this data are the persistent objects and their related streams and stream elements. These constitute the "internal" layer of the application.

The internal layer has the following functions: First, it accepts data from the external layer, and provides the requested data (usually from nonvolatile storage). Second, it accepts data requests from the external layer, and provides the requested data (usually from nonvolatile storage).

The internal layer provides a uniform and consistent interface to the external layer, regardless of the type of external relationship. For example, the relationship may be interactive on the same host, interactive host to workstation, synchronous transaction interface, or initial load. This implies that all of these interface mechanisms work in a consistent manner.

The following assumptions are made about the external interfaces:

1. The external interfaces know which data to push or pull. This data is identified by an associated token value (such as a dialog tag name or an attribute name). There is an existing structure (the list of dialog tags or the metadata) which can be used to find the tokens. This structure is isolated from the rest of the logic of the external layer. This assumption is true for many external interfaces. Additional types of interfaces can be developed to preserve this assumption. Thus, a transaction interface would use the transaction structure to define which data to push or pull, and a workstation to host interface would build a structure to pass to the host to drive processing of the interface.

2. The external layer is in control. This implies that the internal layer performs its data handling only in reaction to stimulus from the external layer. It means that there is no logic flow within the internal object from data update to validation to unit of work commit. Rather, the control of these steps is isolated in the external layer. In the case of an interactive interface, the user is in control of taking the initiative (for example by pressing ENTER for validation and SAVE for unit of work commits). For batch interfaces, this process is automated in the external layer which is in a client-/server relationship with the internal layer.

3. The external layer and internal layer communicate by passing tokens, strings, and return codes. The string is passed in internal format. This is the format of the assign_data and get_data parameters (e.g. assign_data (token, value, RC)).

Figure 8:
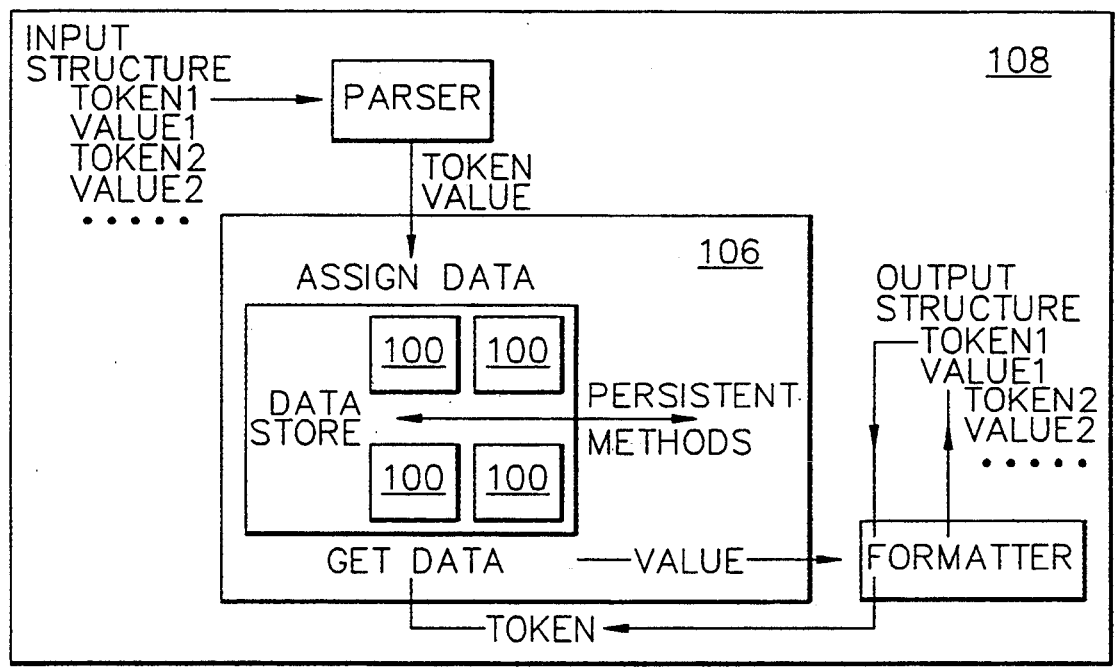

As illustrated in FIG. 8, the invention moves all of the "application related" logic into the internal layer 106, and reduces the external layer 108 to a communication and presentation layer which is independent of the structure or logic of the internal object 100 with which it is working. Thus most of the interface logic is effective at a generic level. The unique aspects of each panel are isolated in the dialog tags (which fields it handles) and class attributes (which internal object it communicates with).

Figure 9:
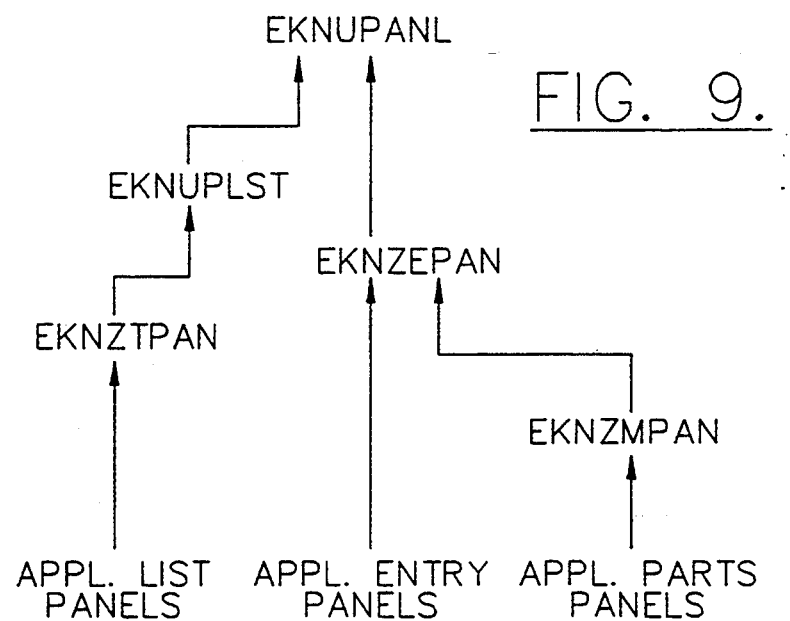
Figure 10:
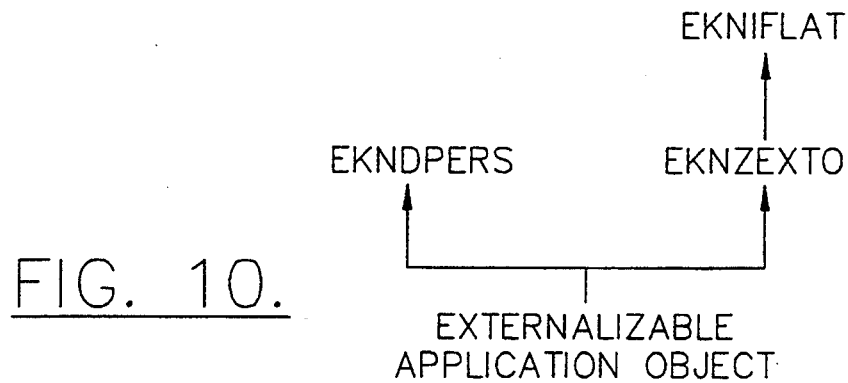

An embodiment of the present invention provides three new classes, the Generic Data Entry Panel (EKNZEPAN), the Generic Parts Panel (EKNZMPAN), and the Generic List Panel (EKNZTPAN). These classes fit into a class hierarchy as illustrated in FIG. 9. The list panels already have generic communications with stream and stream elements. However, a new class (the Externalizable Object EKNZEXTO) has been introduced to provide a uniform interface for the Generic Data Entry Panels to the "internal" objects. This new class also inherits from the Flattenable class EKNIFLAT. It fits into a class hierarchy as illustrated in FIG. 10.

EKNZEPAN provides generic support for data entry panels. This includes communication with the internal object, derivation of context data from the ruler list, and processing logic for the NEW and OPEN actions. This processing is described in detail in connection with FIGS. 12-15. The following methods are effective in EKNZEPAN:

1. Open: This is a polymorphic create method which allows generic processing of data entry panels.

2. Create: The create method takes the ruler list as a parameter, so that the context of the panel can be determined. The ruler list is then used to establish the ruler list of the associated internal object.

3. Init: The Init method performs several functions. It has been split up into several smaller methods:

a. Enable_Abar: The data entry panel has standard actions under the File action. Enable_Abar checks standard methods on the Internal object to see if they have been secured, and uses this to disable actions as necessary.

b. Enable_flds: This method alters the dialog tag definition of the panel prior to display, based on application logic defined by the internal object. This method passes a list of tags to the check_tag method on the internal object. This method is defined on the Externalizable Object (EKNZEXTO), but must be implemented by each application object. Based on the results, the tag may be redefined as required, display only, or removed entirely from the panel. The latter two options can be used to enforce field level security. Within the check_tags method, the tag is associated with an input and output feature in the internal class. These are checked for security. Additional logic may be provided to set required or display_only fields. A character is returned for each tag in the list:
   1) Blank—leave the tag definition alone
   2) S—Suppress this tag completely (by taking it out of the list of dialog tags associated to the panel).
   3) R—Make this tag required
   4) D—Make this tag display only
   5) L—Make this tag required if mode is new, and display only if the mode is open.

c. Display_data_flds: Each panel has a linked list of its tags. This method loops through the list and creates an array of tag names which is passed to the "get_data" method on the internal object (this is a method defined in Externalizable Object EZ-NEXTO). The get_data method is redefined by each internal object to recognize the tag names and to find data in internal format and convert it to string format appropriate for display. The Externalizable Object provides generic support (int_to_ext) to assist in the data conversion. The filled in array is used to populate data in the panel.

Before performing any of these functions, the panel must establish contact with the internal object. Two methods of the Externalizable Object, create_internal and open_internal, are used to accomplish this. Create_internal is used if the data entry panel is operating in "new" mode. It is a polymorphic create which does not require special parameters. It is redefined by each type of internal object to call its own create method. Any specialized parameters are obtained from information in the ruler list. Open_internal is used when the panel is working in "open" mode. In this case, a version of the internal object has been selected when data entry was invoked. However, because of version control considerations, it may be necessary to establish a different version of the internal object and present the new version on the panel to receive updates. Version control is described in application Ser. No. 08/101,618 filed concurrently herewith, entitled System and Method for Controlling Versions of Objects in an Object Oriented Computing Environment, assigned to the assignee of the present invention, the disclosure of which is hereby incorporated herein by reference. Open_internal is provided to allow this processing to be defined by the internal objects. Once again, it does not need special parameters because the version control information is available in the ruler list.

4. Validate: This method is invoked when the user causes a panel interrupt by pressing ENTER or selecting File. Save. It reads the dialog tags to see which tags have been modified, and puts the modified tags and updated values into an array which is passed to the assign_data method on the internal object. This is a method defined in the Externalizable Object. This method must be redefined by each internal object to recognize the tag name, convert the data in string format to internal format, and to assign it to the corresponding internal attribute. The Externalizable Object provides a generic method (ext_to_int) to assist in this data conversion. Once the data has been assigned to the internal object, the validate method defined in the Externalizable Object is called to provide application defined verifications. This method is split into smaller methods (int_add_verify, int_change-verify, and int_delete) which are called depending upon the current mode.

5. FSave: This method is effective at a generic level. It provides all of the unit of work control needed to properly save the update to the internal object and communicate any updates to other active units of work.

Figure 11:
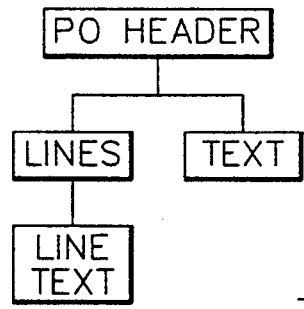
Figure 12:
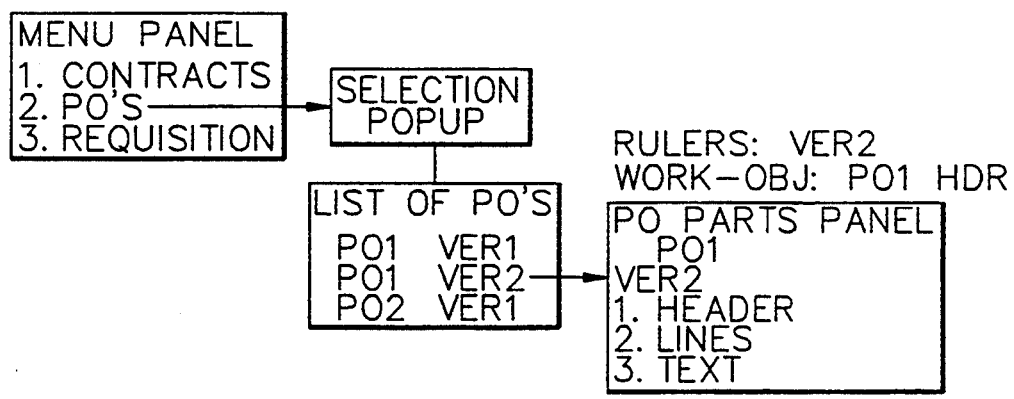

The present invention can be used in conjunction with "complex objects". Complex object processing is described in application Ser. No. 08/101,913, filed concurrently herewith entitled System and Method for Supporting Complex Objects in an Object Oriented Computing Environment, assigned to the assignee of the present invention, the disclosure of which is hereby incorporated herein by reference. A parts panel is a specialized type of data entry panel which is encountered if the object opened from a list or menu panel is a complex object, i.e. it is composed of several discrete types of simple objects. The parts panel allows the components of the complex object to be opened. Typically, as shown in FIG. 11, there will be a controlling object for the complex object, which is opened as the working object for the parts panel. In FIG. 11, the complex object structure of a Purchase Order consists of Header, Line, Text and Line Text. A list of purchase orders would be selected from a main menu panel. The selection popup restricts the purchase orders that appear in the list. Since the Purchase Order is a complex object, a parts panel instead of a data entry panel is displayed when a Purchase Order is opened. Such a parts panel is illustrated in FIG. 12.

Generic processing for the parts panel is provided by the class EKNZMPAN. Associated to this is a Business Factor Table (BFT) EKNZPBFT which associates the class short name of the next panel to be opened for a selection with the dialog tag literal for that selection in the parts panel and the File action (Open or New). This means that each new parts panel can be defined by its dialog tag file, and corresponding entries in EKNZPBFT. No new code needs to be written to support the new parts panel.

When a selection is made, the parts panel checks if the panel to be opened is a list panel, a parts panel, or a data entry panel. If the panel is a list panel, the open_part method is called, passing the ruler list with the working object added. The list panel open_part then uses information in the ruler list to create a stream of the appropriate kind of object. For example, if Line is selected, a stream of lines which match the purchase order number PO1 and Version Ver2 would be selected, as shown in FIG. 13. It is also possible to select Lines and the File action of New (instead of File.Open). This will result in a Line data entry panel (in New mode) being displayed.

If the next panel is a data entry panel, a check is made to see if its working object is the same as the working object for the parts panel. If it is, the working object is passed to the open_part method, but is not added to the ruler list. See FIG. 14. If the working object is not the same, the find_internal method on new working object (a deferred method from the Externalizable Object) is used to find an instance of the new working object to open. Since a data entry panel is being opened, it is assumed that the key information for the working object of the parts panel, plus selection criteria in the ruler list, suffice to find a unique instance of the new working object. In this example, there is only one Purchase Order Text object per Purchase Order (and version), and it is uniquely identified by the Purchase Order number (PO1) and the version (Ver2). The working object for the parts panel is added to the ruler list before the open_part method on the data entry panel is invoked. See FIG. 15. Processing if the next panel is a parts panel is similar to that used when the next panel is a data entry panel.

The following methods are effective in EKNZT-PAN:

1. Create: Since children of the generic list panel do not need to add instance attributes, create can be an effective method here.

2. Open: This is a polymorphic, parameter-free create method which may be invoked from a main menu to start processing without any context information. This method sets the ruler list to null.

3. Open_part: This is a specialized polymorphic create method which opens a new list panel in context. The contextual information is passed in the ruler list. This information is used to select the stream to associate to the panel.

4. Init: This method prepares the panel for initial display. It sets the panel's ruler list to the ruler list passed by the panel Open_part method, and invokes several smaller methods to complete processing:
   a. Update_abar: The class type of the internal object is passed as a parameter. This is used to check standard methods on the internal object to highlite or lowlite the standard FILE actions of NEW, OPEN, and DELETE.
   b. Disp_focal_data: This method uses objects in the ruler list to fill in the context data displayed at the top of the panel. The assumption is that the ruler objects themselves inherit from the Externalizable Object, and that the tag names used to describe the focal point data fields match token names recognized by the rulers. This method invokes call_rulers, which loops through the ruler list and calls check_tags for each ruler. Based on the results, some focal point data fields may be removed from the panel prior to display, to enforce field level security.

5. Validate: This method is invoked any time the user presses ENTER, or selects an action from the action bar. On a list panel, selecting enter does not accomplish anything unless an action has been selected. Accordingly, this method is invoked in conjunction with the Handle method, which is the result of an action being selected. Validate processes first, and determines which rows of the list have been selected.

6. Handle: This method is invoked when an action is selected from the action bar, function key, command area or any other means. It verifies that the appropriate number of rows have been selected for the action, and then calls specialized methods depending on the action selected:
   a. FNEW: This method creates the associated data entry panel in "new" mode, passing the ruler list and a null internal object.
   b. FLOPEN: This method creates the associated data entry panel in "open" mode, passing the ruler list and the selected internal object.
   c. FDELETE: More than one entry in the list may be selected for deletion. This method loops through all of the selected internal objects, and verifies that the object is not in active use by another unit of work. If everything is okay, it invokes the int_delete method on the internal object. This method is defined in the Externalizable Object, but needs to be implemented by each internal object to apply the required verifications and application special processing.

7. Change_node: This method is invoked by the data entry panel to communicate changes back to the list panel, so that the list shows the updated data. This method takes advantage of the get_data interface on the internal object to fill in data for the list node.

8. Term: This method is called when the user cancels out of the panel. It cleans up the memory areas the panel is using, and eliminates the panel's unit of work. EKNZTPAN has one deferred method, create_stream, which is used to select the stream based on information provided either in the ruler list or a selection popup.

Batch update processing is also supported in the Externalizable Object (EKNZEXTO). This class inherits from the flattenable class and implements two deferred methods:

1. Assign_data: This method is implemented to save the tokens and values as they are passed, and then call an additional method (assign_data1) to actually process them. Since all batch interfaces require an action code (the "il_action" described below), this attribute is defined in the Externalizable Object and assign_data1 handles it. This method then invokes assign_data, which is the deferred method required to process data as it comes in from the panels.

2. Post_unflat2: This method is implemented to perform the actual update processing. The logic is similar to that invoked by the generic panels, and makes use of the same methods deferred to the individual internal objects.

a. Context information is provided by "specialized" attributes in the batch update records. These are converted to the same format as for panel processing by the unflat_build and build ruler list methods.

b. The il_action is used to determine how to process the batch update record. If the il_action is ADD, and there is a matching object already on the database, the action defaults to modify. The processing for true adds is similar to the NEW action from the panel. The processing for modifies is similar to the OPEN action from the panel. The list of tokens and values saved during assign_data is used to ensure that only fields which were specified on the incoming batch update record are updated in the database. In addition, a check is made to determine if these represent a modification to the existing values. If no existing value is modified, no update is made. This can be important for version controlled objects, if the incoming system has a less sophisticated version control mechanism. For example, many drawing systems copy the entire Bill of Material for an item up to each new version of a drawing. New data is only created for the BOM Components which actually changed at the new version. This feature of Post_Unflat2 prevents extraneous updates when the data for the new version of the Bill of Material is received from the drawing system.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A uniform external interface for an object oriented computing system on a computing platform, said object oriented computing system including a plurality of objects, each object including an object frame containing data attributes and at least one object method for performing actions on the associated data attributes, said objects being arranged in an inheritance hierarchy of objects to define parent and child objects such that child objects inherit the data attributes and methods of parent objects, wherein selected objects import data from, and export data to, a plurality of external systems, said uniform interface comprising:

a plurality of external interface layers in said object oriented computing system, each of which is associated with a corresponding one of said plurality of external systems, each external interface layer comprising:

means for accepting data from the associated external system and for converting the accepted data into an identifying token and a data value; and means for converting an identifying token and a data value into data which is formatted for the associated external system; and an internal interface layer in said object oriented computing system, said internal interface layer comprising an externalizable object class in said inheritance hierarchy of objects, each of said selected objects which import data from, and export data to, said plurality of external systems being arranged to be child objects of said externalizable object class in said hierarchy of objects, said internal interface layer being responsive to said selected objects and to said external interface layer, and comprising:

an assign data method which accepts said identifying token and said data value from said external interface layer, and which converts said data value to a data attribute associated with one of said selected objects; and a get data method which is responsive to said selected objects, which converts a data attribute into an identifying token and a corresponding data value, and which provides same to said external interface layer;

wherein each of said plurality of external systems comprises a data entry panel, wherein said internal interface layer further comprises means for validating said data value, and wherein each of said external interface layers is free of data validating means; and wherein said internal interface layer further comprises means for determining whether said one of said selected objects is secured and for preventing export of the associated data attribute if said one of said selected objects is secured, and wherein each of said external interface layers is free of data security determining means.

2. The uniform external interface of claim 1 wherein said internal interface layer further comprises means for storing said corresponding data value in nonvolatile storage; and wherein each of said external interface layers is free of means for storing data in nonvolatile storage.

* * * * *